Patented Apr. 1, 1930

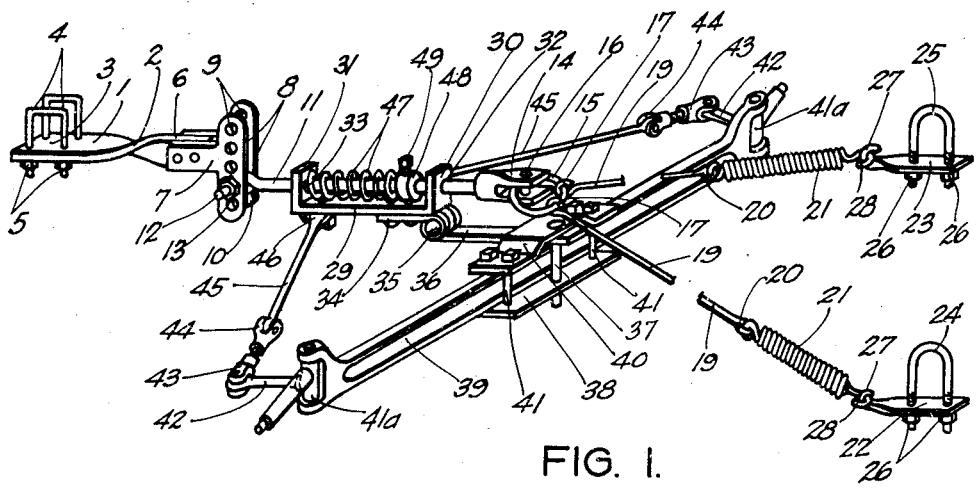

1,752,638

UNITED STATES PATENT OFFICE

JOSEPH B. JOHNSON, OF ALFALFA, OKLAHOMA

FOUR-WHEELED TRAILER HITCH

Application filed December 8, 1928. Serial No. 324,647.

My invention relates to a four wheeled trailer hitch.

The objects of my invention are to provide a device of the class described, which will be new, novel, and of utility; which will prevent the sudden jerking, chugging and pulling of the car or vehicle pulling the trailer; which will prevent the sudden twisting, turning, jerking, chugging and stopping of the trailer which is being drawn; which is simple and durable; which may be hitched to and adjusted on almost all makes of automobiles; which will keep the drawing vehicle and the drawn trailer in practical alinement with each other; which will take up the slack between the automobile or vehicle doing the pulling and the trailer being pulled; which will be comparatively cheap, easily and cheaply manufactured; easily and quickly attached and detached; and which will be efficient for all of the purposes for which it is intended.

The principal objections and defects of trailers now in use, and especially to four-wheeled trailers, are, that they cannot be kept in alinement, or approximate alinement on the road; cannot be kept from sudden chugging, turning, stopping, and twisting. This is very hard on the trailer and the vehicle drawing the trailer, and is dangerous to the safety of the driver of the drawing vehicle, and to other travelers on the road. This is especially true in trailers carrying long poles, rails and the like, as it is likely to whip-crack into another vehicle without any notice or warning. These and other objections are obviated by my invention.

With these and other objects in view as will more fully appear, my invention consists in the construction, novel features, and combination of parts hereinafter more fully described, pointed out in the claims hereto appended, and illustrated in the accompanying one-sheet drawing, of which, Figure 1 is a perspective view of the attachment for a four-wheeled trailer hitch;

Fig. 2 is a plan view of the attachment showing the relation of the pulling car and the four-wheeled trailer hitch.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

One embodiment of my invention is shown as follows: I provide a strap-iron 1 of suitable strength having a half turn twist 2 therein; its horizontal end 3 being adapted for fastening to a suitable holding position, such as the rear spring of a car, by U-bolts 4 and nuts 5; its other vertically disposed end 6 is adapted for being rigidly fastened, by suitable holding members, such as rivets, to a beam-clevis 7 having a bifurcated head 8 and having in each bifurcated portion a plurality of alined holes 9. Said beam-clevis 7 is adapted for vertical adjustment of the front eye 10 of a link, or shaft 11, said eye 10 being held in one of the alined pairs of holes 9 by a bolt 12 and nut 13, or other suitable holding means. The rear end of said shaft 11 is provided with a clevis 14 being adapted for fastening to a ring 15 by proper holding means, such as a pivot-pin, clevis-pin, 16 or the like; ring 15 is adapted for receiving hooks 17 on the ends of extension rods 19. An eye 20 on the rear of each of said rods 19 is adapted for receiving and holding an expansion spring 21. I provide also strap-iron holding-plates 22 and 23 being adapted for fastening to the rear axle 41 of said four-wheeled trailer adjacent each of its ends by U-bolts 24 and 25 and nuts 26; each of said holding plates has a hook 27 at its front end for holding the eye 28 on one end of each of said expansion springs. I also provide a U-strap 29 its upstanding ends 30 and 31 being provided with holes 32 and 33 for movably fitting said shaft 11 adjacent its center. Beneath said U-strap 29 and preferably riveted thereto, I provide a lug 34 having two rearwardly extending portions each having an eye 35 in which to fasten the front ends of a tongue 36 extending backwardly therefrom over the front axle of said trailer having a hole therethrough for receiving a king-pin 37. I also provide an under plate 38 for fitting under the central portion of the front axle 39 of said trailer. I also provide an upper plate 40 having its ends bent downwardly and being bolted by suitable bolts 41 to said under plate, said upper plate having its central portion bent upwardly for receiving between it and the top of the front axle the rear end of said tongue 36. Said king-pin 37 is adapted to pass through the central portion of said upper plate, said tongue, and the lower plate, holding said tongue and said front axle together. This is a reciprocative movement permitting the turning of the front wheels of the four-wheeled trailer without the twisting or cramping of the parts making up the device. Within said U-strap and surrounding shaft 11 I provide a compression coil spring 47 being adjustable in varying positions on said shaft 11 by a collar 48 and set-screw 49. This allows the longitudinal movement of shaft 11 in said U-strap 29 but limits the same therein, and acts to stabilize such longitudinal movement thereof with relation to extension rods 19 and expansion springs 21 and rear axle 41. Said tongue is so situated so as to give freedom of lateral movement thereof. I also provide an arm 42 being adapted to extend forwardly from the knuckle on each side of the front axle connecting with said arm at its front end and pivotal therewith is a bifurcated end of a coupling 43 for permitting lateral movement of the parts connecting therewith; said bifurcated end of said coupling 43 is fastened to another similar bifurcated coupling 44 adapted for connecting a tie-rod 45, said last named coupling 44 is disposed at right-angles to said first coupling 43 for permitting vertical and lateral movement of said tie-rod 45, the two couplings constituting in a measure a universal joint. The opposite end of said tie-rod is fastened by suitable securing means underneath the front end of said U-strap 29. It will be understood that a similar arm and connections are had on each end of said front axle reaching to said U-strap 29.

In operation the shaft 11 may be vertically adjusted in alined holes 9 in companion members 8 of beam-clevis 7. The desired adjustment may depend on the height of the pulling car and the height of the trailer, or on the manner in which the trailer is loaded, or with what it is loaded as to its form, length, weight and shape. The length of the shaft 11 and rods 19 may be varied as desired owing to the length at which it is desired to have the trailer extended or coupled up closely. A sudden spurt forward of the front pulling car, or a sudden stopping or holding back of or obstruction to the progress of the trailer acts first to pull shaft 11 forward, thereby extending expansion springs 21 and pulling rear axle 41 forward; after the first effect as described a compensating effect is had by compression spring 47 being compressed by collar 48 moving forward and compressing said spring 47 against upstanding lug 31 on strap 29, the recoil of said compression spring forcing shaft 11 in the contrariwise direction assists to equalize the effect of the expansion of expansion springs 21 and the jerking and chugging effect between said pulling vehicle and said trailer is gradually dissipated and neutralized, and the two vehicles run smoothly with relation to each other again.

Having thus described my invention what is claimed and desired to be secured by Letters Patent is:

1. In combination with the front and rear axles of a trailer, of a device of the class described, comprising means for fastening to the rear axle of a drawing automobile, a beam-clevis fastened to said means for fastening a shaft in varying adjusted positions, a shaft having its front end adapted for fastening in said beam-clevis, and having at its rear end a removable clevis for holding a ring-holding means, a ring-holding means, a U-strap adapted for movably fitting said shaft intermediate its ends and for pivotally holding a tongue member extending rearwardly therefrom, and for movably holding tie-rods adjacent its forward end, a compression coil spring encircling said shaft within said U-strap being adapted for anchoring to said shaft in varying adjusted positions by a collar and set-screw, an arm rigidly connecting each knuckle of the front axle, each front end pivotally connecting a bifurcated coupling for lateral movement, each of said couplings connecting a second bifurcated coupling for vertical movement, each of said last named couplings pivotally connecting the outer end of one of said tie-rods for movement with said U-strap on said tongue member, king-pin means adapted for pivotally connecting said tongue centrally on said front axle, extension rods connecting said ring holding means, expansion springs connecting the rear ends of said extension rods, holding means adapted for connecting on the rear axle of said trailer, and for holding said expansion springs, said compression coil spring and its co-acting parts adapted to reciprocatingly co-act with said expansion springs and their co-acting parts for adjustably taking up the slack and lost motion between said trailer and said drawing automobile, and keeping them in alined position.

2. A device of the class described, comprising means for fastening to the rear axle of a drawing vehicle, having a beam-clevis fastened thereon, a shaft having its front end adapted for differently adjusted positions on said beam-clevis, its rear end being a removable clevis member adapted for holding a ring holding member, a ring holding member, a U-strap movably fitting said shaft intermediate its ends, a coil compression spring encircling said shaft within said U-strap, a collar and set-screw for holding said compression spring on said shaft in differently adjusted positions, said U-strap being adapted adjacent its rear end for holding a tongue member, a tongue member being adapted for pivotally fastening centrally on said front axle, an arm rigidly connecting the respective knuckles on said front axle, being adapted for connecting a bifurcated coupling for lateral movement, said coupling being adapted for connecting a second bifurcated coupling for vertical movement said second coupling being adapted for pivotally connecting the outer end of one of said tie-rods for movement on said U-strap and said tongue member with relation to the movement of the respective wheels on said front axle, extension rods connecting said ring holding member at their front ends and expansion springs at their rear ends, expansion springs having their rear ends adapted for connecting holding members on the rear axle of said trailer, holding means for anchoring to said rear axle, said compression coil spring and its co-acting parts respectively acting with said expansion springs and their co-acting parts for adjustably keeping said drawing automobile and said trailer in alined position and taking up the slack and lost motion between them.

3. A device of the class described, comprising means for fastening to a drawing vehicle, for drawing a trailer, having a beam-clevis connected therewith, a shaft adapted to fasten to said beam-clevis and extending horizontally therefrom for pulling a trailer and for fastening to a ring holding means, a ring holding means, extension rods and expansion springs means for connecting said holding means being adapted for connecting the rear axle of said trailer, U-strap means movably mounted on said shaft, tongue means pivotally fastened thereto adapted for fastening to the front axle of a trailer, tie-rod means for fastening movably adjacent the front end of said U-strap and connecting vertically and laterally moving bifurcated couplings said coupling being pivotally anchored on an arm rigidly attached to the respective knuckles of the front axle of said trailer for movement on said U-strap, tongue member, and front wheels of said trailer, a compression coil spring encircling said shaft within said U-strap being anchored to said shaft in differently adjusted positions by a collar and set-screw, said compression coil spring and its co-acting parts reciprocatingly acting with said expansion springs and their co-acting parts for holding said drawing automobile and said trailer in alined position and to take up the slack and lost motion between them.

JOSEPH B. JOHNSON.